(12) United States Patent
Frank et al.

(10) Patent No.: US 9,527,380 B2
(45) Date of Patent: Dec. 27, 2016

(54) CAP-INSTALLATION SIGNAL SYSTEM FOR FILLER NECK CAP

(75) Inventors: Louis T. Frank, Connersville, IN (US); Michael S. Brock, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 841 days.

(21) Appl. No.: 13/481,684

(22) Filed: May 25, 2012

(65) Prior Publication Data

US 2013/0008906 A1 Jan. 10, 2013

Related U.S. Application Data

(60) Provisional application No. 61/489,943, filed on May 25, 2011, provisional application No. 61/568,511, filed on Dec. 8, 2011.

(51) Int. Cl.
*B60K 15/04* (2006.01)

(52) U.S. Cl.
CPC .................. *B60K 15/0406* (2013.01)

(58) Field of Classification Search
CPC ................ B60K 15/0406; B60K 2015/0451; B60K 2015/0432
USPC ..... 220/327, 212.5; 292/27, 34, 37; 116/100
See application file for complete search history.

(56) References Cited

U.S. PATENT DOCUMENTS

| | | |
|---|---|---|
| 4,453,388 A | 6/1984 | Baker et al. |
| 4,765,505 A | 8/1988 | Harris |
| 5,110,003 A | 5/1992 | MacWilliams |
| 5,183,173 A | 2/1993 | Heckman |
| 5,449,086 A | 9/1995 | Harris |
| 5,480,055 A | 1/1996 | Harris et al. |
| 5,520,300 A * | 5/1996 | Griffin ............... B60K 15/0409 220/210 |
| 5,540,347 A | 7/1996 | Griffin |
| 5,638,975 A | 6/1997 | Harris |
| 5,791,507 A | 8/1998 | Harris et al. |
| 5,794,806 A | 8/1998 | Harris et al. |
| 5,829,620 A * | 11/1998 | Harris et al. ............. 220/203.26 |
| 6,325,233 B1 * | 12/2001 | Harris ......................... 220/288 |
| 6,739,472 B2 | 5/2004 | Newport |
| 6,745,914 B2 * | 6/2004 | Hagano et al. ............... 220/288 |
| 6,763,966 B2 | 7/2004 | Harris |
| 7,344,042 B2 | 3/2008 | Hagano |
| 2011/0183805 A1 * | 7/2011 | Chan ........................ B62M 6/50 475/254 |
| 2011/0240643 A1 * | 10/2011 | Ripberger et al. ......... 220/212.5 |

OTHER PUBLICATIONS

International Search Report dated Jul. 27, 2012, for PCT/US2012/039375.
Extended EP Search Report completed on Feb. 4, 2015 and issued in connection with European Patent Application No. 12789905.2.

* cited by examiner

*Primary Examiner* — Anthony Stashick
*Assistant Examiner* — Raven Collins
(74) *Attorney, Agent, or Firm* — Barnes & Thornburg LLP

(57) ABSTRACT

A filler neck cap is adapted to mate with and close a filler neck. The filler neck cap includes a closure configured to engage the filler neck, an outer handle configured to be gripped by a consumer, and a torque-transmission member configured to transmit torque applied to the outer handle by the consumer to the closure to rotate the closure relative to the filler neck during installation of the cap in the filler neck and removal of the cap from the filler neck.

10 Claims, 10 Drawing Sheets

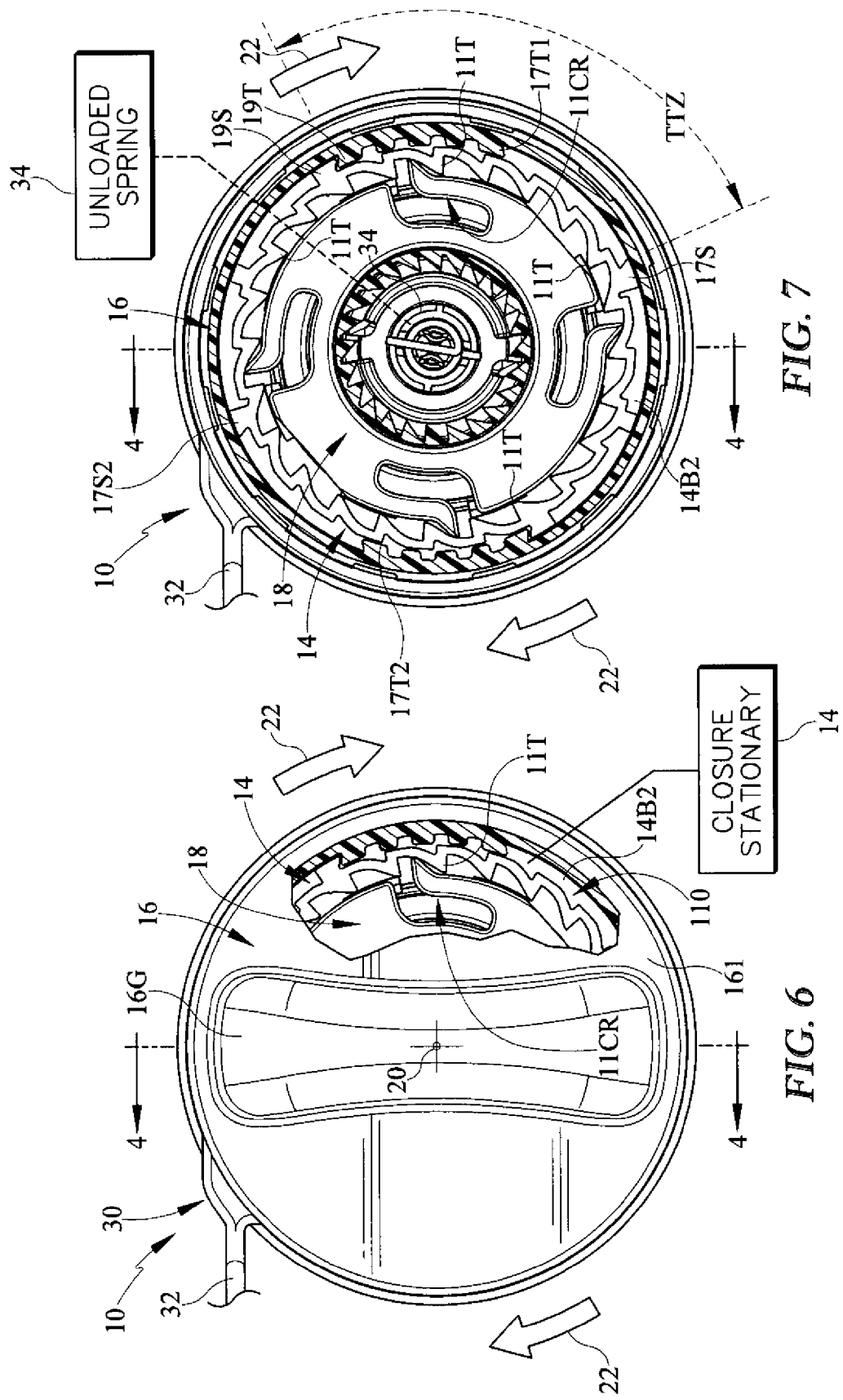

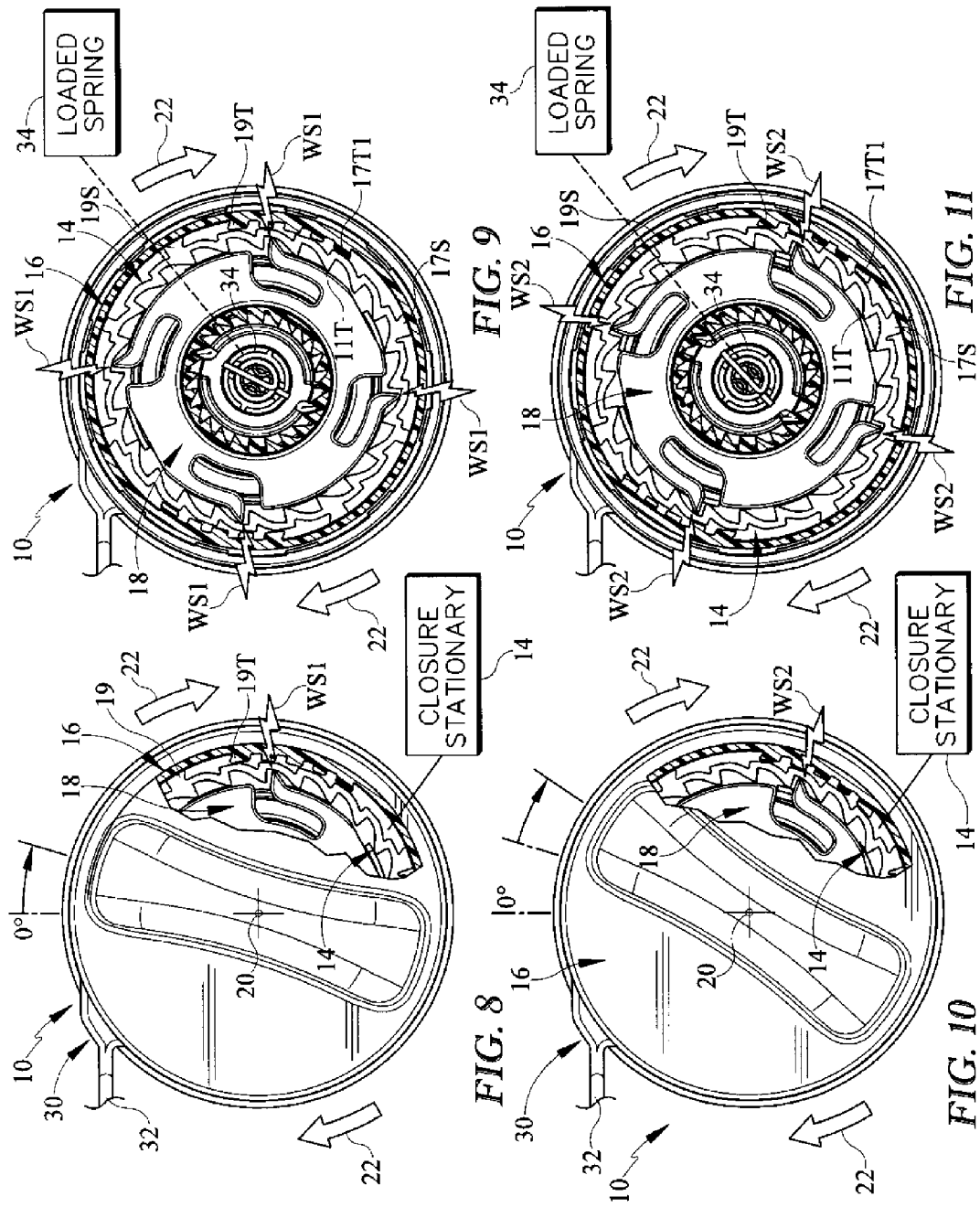

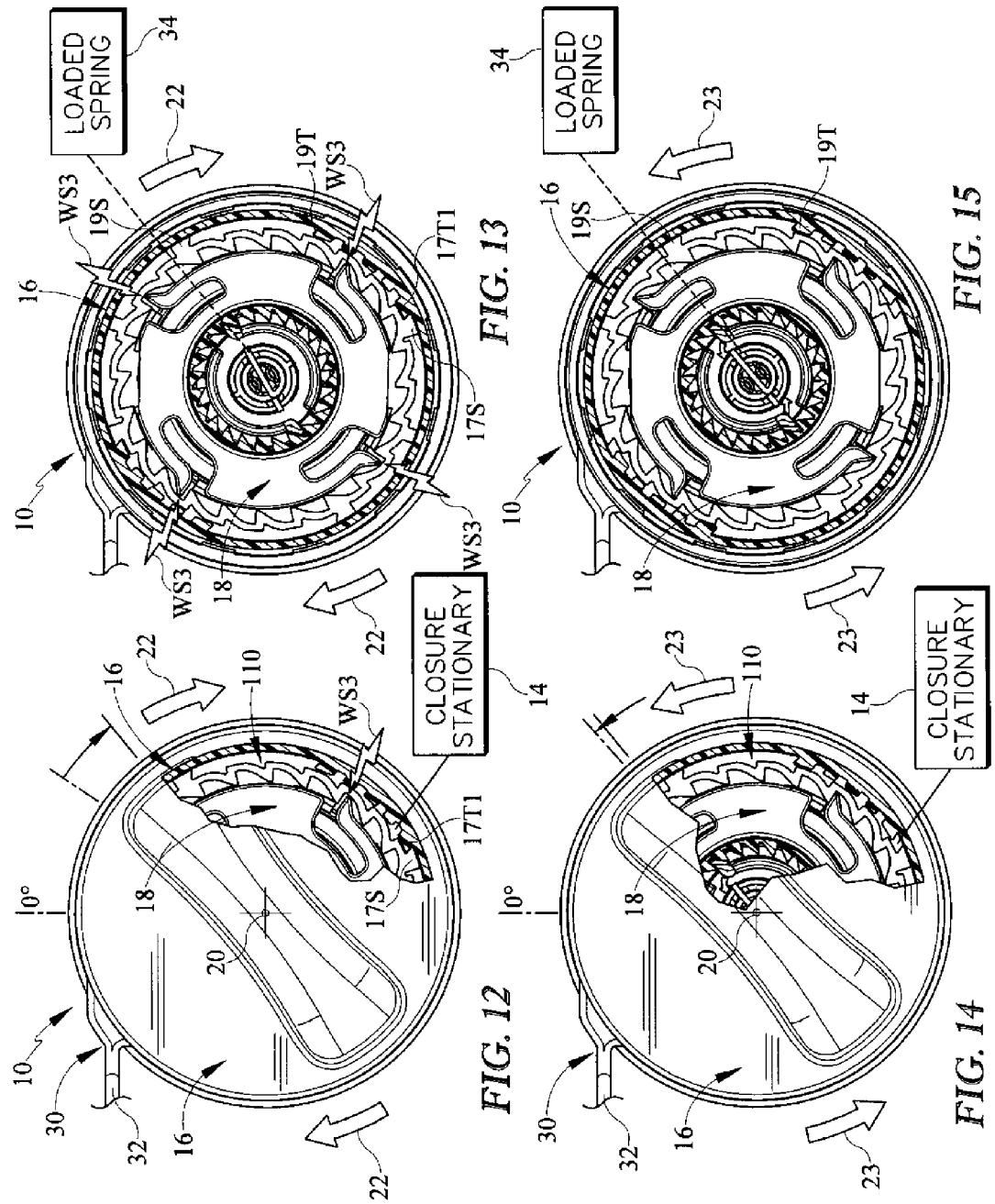

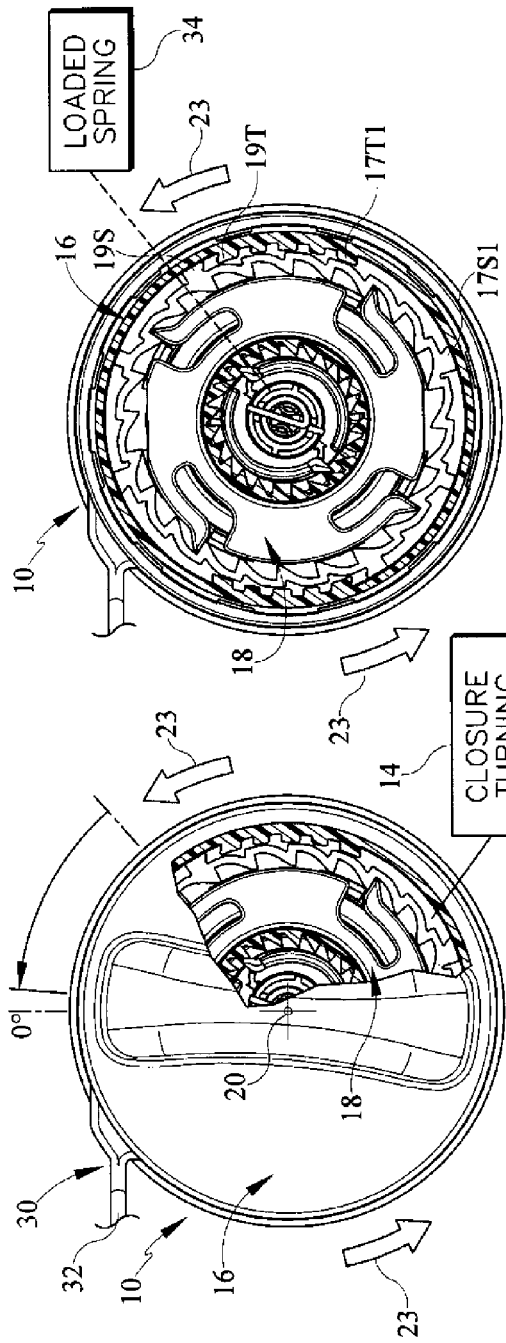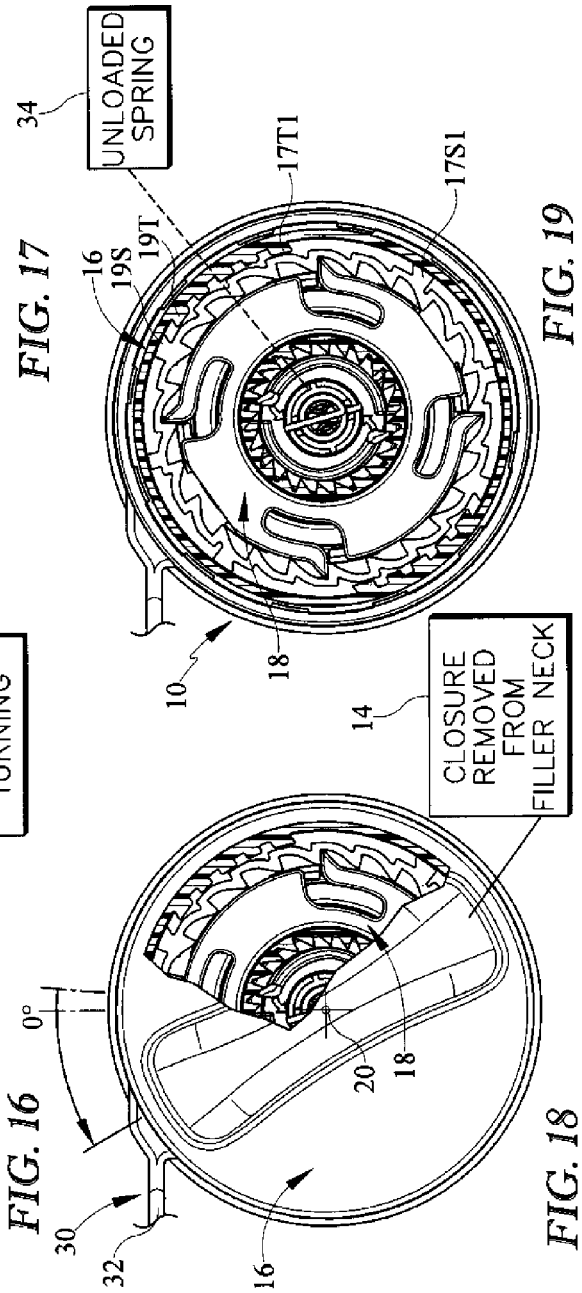

CAP-INSTALLATION SIGNAL SYSTEM FOR FILLER NECK CAP

PRIORITY CLAIM

This application claims priority under 35 U.S.C. §119(e) to U.S. Provisional Application Ser. No. 61/489,943, filed May 25, 2011 and Ser. No. 61/568,511, filed Dec. 8, 2011, which are expressly incorporated by reference herein.

BACKGROUND

The present disclosure relates to filler neck caps, and particularly to a rotatable cap for closing the open mouth of a filler neck. More particularly, the present disclosure relates to a filler neck closure cap designed to provide a cap-installation signal to a user to alert the user that the cap is installed in the filler neck.

SUMMARY

According to the present disclosure, a filler neck cap includes a handle and a closure adapted to mate with a fuel tank filler neck and close a mouth opening into a nozzle-receiving passageway formed in the filler neck. A cap installer mounts the filler neck cap on the filler neck by applying a torque to the handle to turn the cap about an axis of rotation to rotate the closure until the closure arrives at a stationary filler-neck closing position in the filler neck. Upon removal of the cap from the filler neck, a fuel-dispensing nozzle can be inserted into the nozzle-receiving passageway formed in the fuel tank filler neck through the open mouth to deliver fuel to the fuel tank.

In illustrative embodiments, the filler neck cap includes a closure configured to mate with the filler neck and close an aperture opening into a fuel-conducting passageway formed in the filler neck. The filler neck cap also includes a rotatable outer handle and a torque-transmission member arranged to lie under the outer handle and rotate in a cap-advancing (clockwise) direction with the outer handle during installation of the filler neck cap in the filler neck.

In illustrative embodiments, the torque-transmission member is configured to include a circular hub and a deflectable closure rotator cantilevered to the circular hub. There are four deflectable closure rotators coupled to the circular hub and arranged to lie generally in NORTH, EAST, SOUTH, and WEST positions relative to the circular hub.

In illustrative embodiments, during installation of a filler neck cap in a filler neck, a cap installer grips and turns the outer handle about an axis of rotation to cause the torque-transmission member and its deflectable closure rotator to rotate about the axis of rotation. The deflectable closure rotator (1) applies torque to rotate the closure in the filler neck until the closure arrives at a stationary closure hard-stop position in the filler neck and (2) generates a discernable warning signal to alert the cap installer that the filler neck cap has been installed in the filler neck during continued rotation of the outer handle relative to the closure until the outer handle finally arrives at a stationary handle hard-stop position.

In an illustrative embodiment, the deflectable closure rotator is arranged to engage torque teeth included in a torque receiver provided in the closure normally to transmit torque from the torque-transmission member to the closure during installation of the cap in the filler neck to cause the closure to rotate in the filler neck in response to clockwise rotation of the outer handle relative to the filler neck. The deflectable closure rotator and the torque teeth also cooperate to define a cap-installation signaler that generates a discernable warning signal to alert a cap installer that the closure has already arrived at a stationary filler neck-closing position and that continued rotation of the outer handle is unnecessary.

In accordance with the present disclosure, a fuel cap designer can configure the filler neck cap to produce at most a predetermined number of discernable warning signals by providing a like number of torque teeth that are arranged to be engaged by the deflectable closure rotator after the closure arrives at the stationary closure hard-strip position in the filler neck and before the outer handle arrives at the stationary handle hard-stop position. These signal-generating torque teeth are located in series in a signal-generation zone provided on the closure and located between an anti-rotation stop included in the closure and a rotation-inhibitor tab included in the outer handle when the outer handle is rotated by a torsion spring relative to the closure to assure a ready-to-install initial position.

The torque teeth are arranged to lie in the signal-generation zone at the start of a cap-installation activity and to intercept the rotating deflectable closure rotator. A discernable warning signal (e.g., clicking sound or tactile sensation) is produced each time the deflectable closure rotator engages and then disengages one of the torque teeth. For example, only one warning signal will be provided if the fuel cap designer provides only one torque tooth in the signal-generation zone. In contrast, a series of three warning signals could be generated if the fuel cap designer provides a series of three torque teeth in the signal-generation zone.

In illustrative embodiments, after the closure has arrived at a stationary filler-neck closing (hard stop) position and during continued clockwise rotation of the outer handle relative to the stationary closure in the latter stage of a cap-installation activity, a radially outwardly extending drive head carried on an elastic spring arm of the deflectable closure rotator is moved over and past each of the radially inwardly extending torque teeth included in the closure and provided in a signal-generation zone to produce the discernable warning signal. Such a signal is provided to alert a person installing the filler neck cap that the cap has already arrived at the filler neck-closing position and that continued rotation of the outer handle relative to the filler neck is not needed. In an illustrative embodiment, a clicking sound and a tactile sensation is provided each time the head is moved over and past one of the torque teeth provided in the signal-generation zone.

A torsion spring is coupled to the outer handle and to the closure and arranged to extend through a central aperture formed in the torque-transmission member in illustrative embodiments of the present disclosure. The torsion spring is configured to provide handle-reset means for automatically rotating the closure about the axis of rotation relative to the outer handle in a cap-removal direction while a user is gripping the outer handle as soon as the base of the closure is separated from the filler neck during a cap-removal activity to cause a handle-locator stop that is coupled to the closure to rotate therewith to move to engage a handle-locator tab that is coupled to the outer handle to rotate therewith so that further rotation of the closure relative to the outer handle is blocked and the closure is ready to be installed in a filler neck and the signal-generating torque teeth are once again located in the signal-generation zone to be engaged by the deflectable closure rotator during reinstallation of the filler neck cap in the filler neck.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 6-13 show a series of views of the filler neck cap during installation of the filler neck cap in the filler neck;

FIG. 6 is a top plan view, with portions broken away, of the filler neck cap after it has been rotated in a cap-advancing (clockwise) direction to cause a rotation-inhibitor tab provided in a closure rotation blocker and included in the closure to engage an anti-rotation stop provided in the closure rotation blocker and included in the filler neck as shown in FIG. 1 to provide a HARD STOP for the closure and block further rotation of the closure in the filler neck so that the closure now occupies a stationary position in the filler neck without blocking continued clockwise rotation of the outer handle relative to the stationary closure and showing that the drive head of one of the deflectable closure rotators engaged an inclined ramp surface provided on one of the torque teeth included in the stationary closure so as to be able to transmit cap-advancing (clockwise) torque to the closure during cap installation in the filler neck;

FIG. 7 is a view similar to FIG. 6 with most of the outer handle removed;

FIG. 8 is a top plan view similar to FIG. 6 showing that the outer handle has been rotated further in the cap-advancing (clockwise) direction relative to the stationary closure to cause the drive head in the deflectable closure rotator to snap past a downstream first torque tooth provided in the signal-generation zone to produce a FIRST discernable warning signal such as an audible noise and/or a tactile sensation to alert a cap installer turning the outer handle (a first time) that the closure has already seated in the filler neck and arrived at a stationary filler-neck closing (hard stop) position and that further rotation of the outer handle (though possible) is not needed;

FIG. 9 is a view similar to FIG. 8 with most of the outer handle removed showing that the drive head of each deflectable closure rotator snaps past a first torque tooth to produce a FIRST discernable warning signal represented by a thunderbolt symbol;

FIG. 10 is a top plan view similar to FIG. 8 showing that the outer handle has been rotated still further in the cap-advancing (clockwise) direction relative to the stationary closure to cause the drive head in the deflectable closure rotator to snap past a downstream second torque tooth provided in the signal-generation zone to produce a SECOND discernible warning signal such as an audible noise and/or a tactile sensation to alert the cap installer turning the outer handle (a second time) that the closure has already seated in the filler neck and arrived at a stationary filler neck closing (hard stop) position;

FIG. 11 is a view similar to FIG. 10 with most of the outer handle removed showing that the drive head of each deflectable closure rotator snaps past a second torque tooth to produce a SECOND discernable warning signal represented by a thunderbolt symbol;

FIG. 12 is a top plan view similar to FIG. 10 showing that the outer handle has been rotated even further in the cap-advancing (clockwise) direction relative to the stationary closure to cause the drive head in the deflectable closure rotator to snap past a downstream third torque tooth provided in the signal-generation zone to produce a THIRD discernable warning signal such as an audible noise and/or a tactile sensation to alert the cap installer turning the outer handle (a third time) that the closure has already seated in the filler neck and arrived at a stationary filler-neck closing position;

FIG. 13 is a view similar to FIG. 12 with most of the outer handle removed showing that the drive head of each deflectable closure rotator snaps past a third torque tooth to produce a THIRD discernable warning signal represented by a thunderbolt symbol;

FIGS. 14-19 show a series of views of the filler neck cap during removal of the filler neck cap from the filler neck;

FIG. 14 is a top plan view similar to FIG. 12 showing that a counterclockwise torque has been applied to the outer handle to urge the torque-transmission member to begin to rotate in a counterclockwise direction to cause a flat driver face on the drive head of the deflectable closure rotator to mate with a companion flat driven face on the third torque tooth to prepare the closure to be rotated in a cap-removal (counterclockwise) direction relative to the filler neck during a process of removing the filler neck cap from the filler neck;

FIG. 15 is a view similar to FIG. 14 with most of the outer handle removed;

FIG. 16 is a top plan view similar to FIG. 14 showing that the closure is turning in the filler neck in response to rotation of the outer handle in the cap-removal (counterclockwise) direction and application of a rotation inducing torque from the deflectable closure rotators to the torque teeth of the closure;

FIG. 17 is a view similar to FIG. 16 with most of the outer handle removed;

FIG. 18 is a top plan view similar to FIG. 16 after the filler neck cap has been removed from the filler neck; and FIG. 19 is a view similar to FIG. 18 with most of the outer handle removed and showing that the torsion spring (that had been loaded during the cap-installation process) was freed and able to unload as soon as the filler neck cap was removed from the filler neck to reset the position of the outer handle and its rotation-inhibitor tab so that the filler neck cap is ready to be reinstalled in a filler neck.

DETAILED DESCRIPTION

Figure 1:
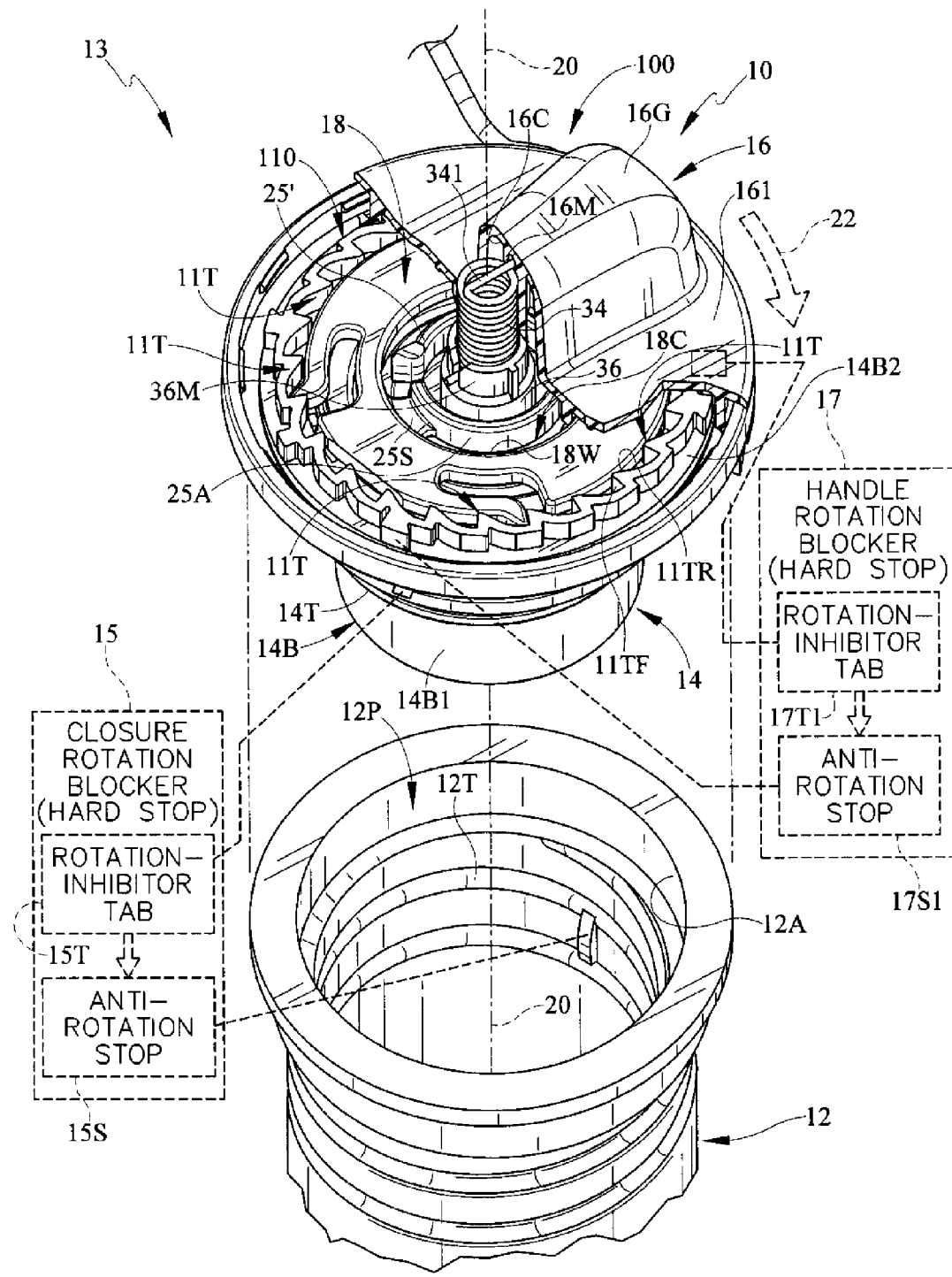
FIG. 1 is a perspective view of a filler neck in accordance with the present disclosure prior to insertion of the cap into the mouth of an underlying fuel tank filler neck, with portions of an outer handle included in the filler neck cap broken away to show an upper portion of a closure configured to mate with the filler neck and close the open mouth of the filler neck and provided with a torque receiver comprising a ring of radially inwardly extending torque teeth along a circular outer edge of the closure and just under the outer handle, a torsion spring arranged to wind about an axis of rotation of the rotatable outer handle and include a lower end coupled to an underlying torsion spring retainer and an upper end adapted to be coupled to the underside of the outer handle to provide handle-reset means, and a torque-transmission member centered above the torsion spring retainer and provided with four deflectable closure rotators (two visible) and arranged on top of the closure to cause each of the deflectable closure rotators to engage the radially inwardly extending torque teeth included in the closure first to transmit torque from the handle to the closure during installation of the filler neck cap in the filler neck as suggested in FIGS. 6 and 7 and then to snap past one or more torque teeth provided in a signal-generation zone to generate a series of first, second, and third discernable warning signals (represented diagrammatically by THUNDERBOLT symbols) to alert a cap installer that the closure has already arrived at a filler-neck closing position in the filler neck as suggested in FIGS. 8, 10, and 12.

A filler neck cap 10 is configured to mate with a filler neck 12 to close an inlet aperture 12A opening into a fuel-conducting passageway 12P formed in filler neck 12 as suggested in FIG. 1. A cap-installation signaler 11 in accordance with the present disclosure is included in filler neck cap 10 as shown diagrammatically in FIG. 2. Cap-installation signaler 11 is defined by a deflectable closure rotator 11CR included in a torque-transmission member 18 included in filler neck cap 10 in cooperation with radially inwardly extending torque teeth 11T included in a torque receiver 110 included in closure 14 included in filler neck cap 10. Each torque tooth 11T includes an inclined ramp surface 11TR and a vertical flat surface 11TF as shown, for example, in FIGS. 1, 2, 2B, and 5.

Cap-installation signaler 11 is configured to provide signal means for producing a discernable warning signal (represented by THUNDERBOLT SYMBOL WS1) to alert a cap installer turning an outer handle 16 included in filler neck cap 10 in a cap-advancing (e.g., clockwise) direction 22 in filler neck 12 about an axis of rotation 20 during installation of filler neck cap 10 in filler neck 12 that closure 14 has seated in a filler-neck closing position in filler neck 12 as suggested in FIGS. 8 and 9. The cap installer receiving discernable warning signal WS1 will understand that filler neck cap 10 has been installed in filler neck 12 and then stop turning outer handle 16 about axis of rotation 20. Two or more further discernable warning signals WS2, WS3 are contemplated in the present disclosure as suggested in FIGS. 10-13 before a rotation-inhibitor tab 17T1 coupled to outer handle 16 engages an anti-rotation stop 17S1 coupled to stationary closure 14 to provide a HARD STOP and block any further rotation of outer handle 16 in cap-advancing (clockwise) direction 22 relative to the stationary closure 14 about axis of rotation 20.

Figure 5:
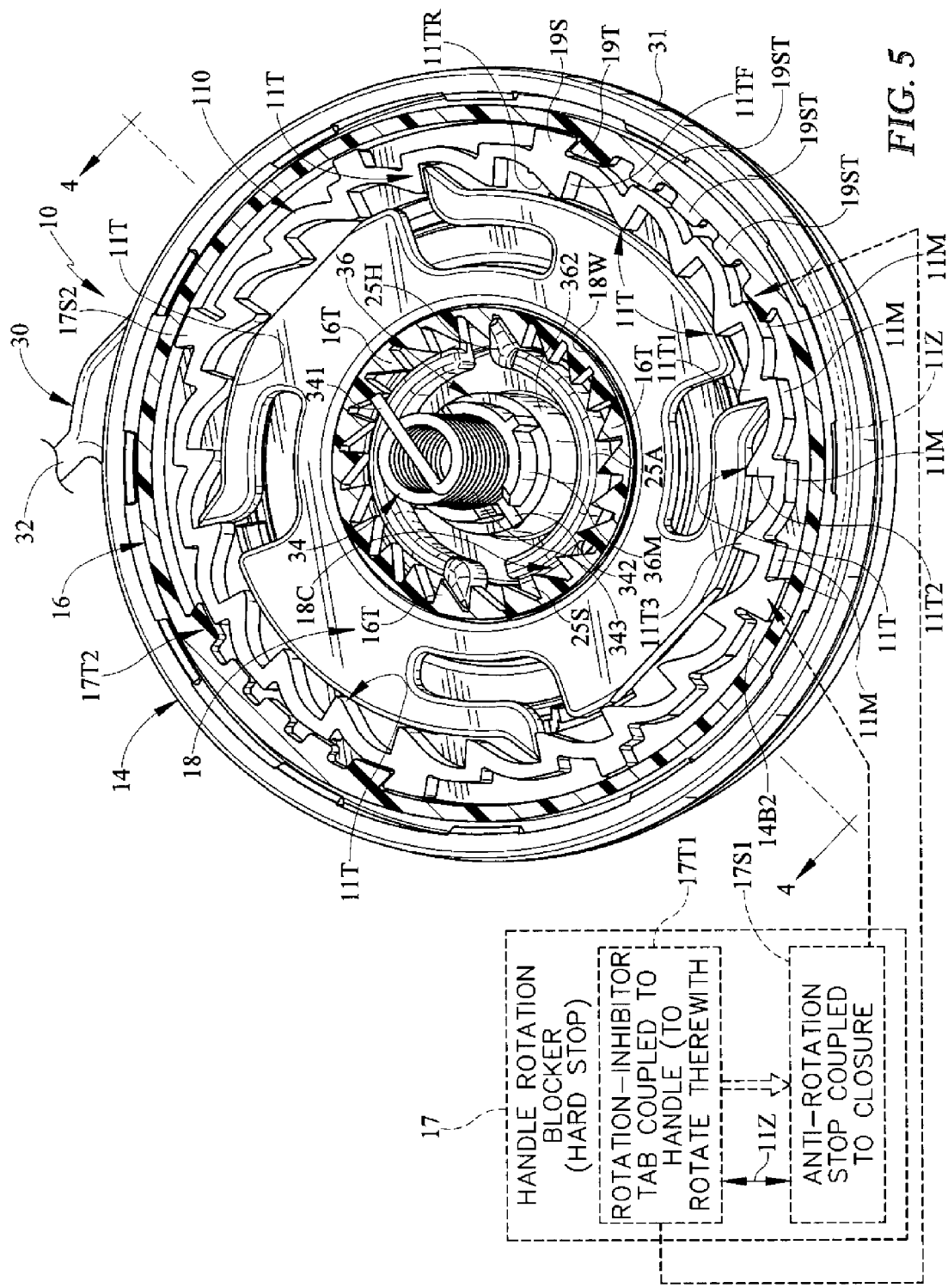
FIG. 5 is an enlarged view of the filler neck cap of FIGS. 1 and 4 with a portion of the outer handle removed to show the torsion spring, the underlying torsion spring retainer, the smaller ring of radially inwardly extending torque teeth included in the outer handle and arranged to surround the two curved deflectable ratchet arms included in the torque-transmission member, the torque-transmission member with its circular hub, two ratchet arms, and four closure rotators, the larger ring of radially inwardly extending torque teeth included in the closure and arranged to surround the four deflectable closure rotators included in the torque-transmission member, and an outer annular side wall included in the outer handle and arranged to surround the ring of torque teeth included in the closure, and a handle rotation blocker including two opposing anti-rotation stops coupled to an outer surface of the ring of torque teeth included in the closure and two opposing rotation-inhibitor tabs coupled to an inner surface of the annular side wall of the outer handle.

In accordance with the present disclosure, a fuel cap designer can predetermine the maximum number of discernable warning signals that can be generated after the closure 14 arrives as the closure hard-stop position as is seated in the filler-neck closing position shown in FIGS. 5-7 and before the outer handle 16 is rotated from a ready-to-install initial position shown in FIG. 5 to a stationary handle hard-stop position shown in FIGS. 12 and 13 by providing an equal number of torque teeth 11T in a signal-generation zone 11Z provided between anti-rotation stop 17S1 and rotation-inhibitor tab 17T1 when outer handle 16 lies in the ready-to-install initial position as suggested in FIG. 5. As suggested in FIG. 5, three torque teeth 11T1, 11T2, and 11T3 are provided in signal-generation zone 11Z and this provides for at most three discernable warning signals WS1, WS2, and WS3 as suggested in FIGS. 6-13 if outer handle 16 is rotated by a cap installer during a cap-installation activity relative to a stationary closure 14 until rotation-inhibitor tab 17T1 of outer handle 16 engages the stationary anti-stop tab 17S1 of closure 14.

Filler neck cap 10 includes an outer handle 16 and a closure 14 including a base 14B adapted to mate with a fuel tank filler neck 12 and close a mouth 12A opening into a nozzle-receiving passageway 12P formed in filler neck 12. A cap installer mounts filler neck cap 10 on filler neck 12 by applying a torque to outer handle 16 to turn cap 10 about an axis of rotation 20 to rotate closure 14 until closure 14 arrives at a stationary filler-neck closing position in filler neck 12. Upon removal of cap 10 from filler neck 12, a fuel-dispensing nozzle can be inserted into nozzle-receiving passageway 12P formed in fuel tank filler neck 12 through the open mouth 12A to deliver fuel to the fuel tank.

Figure 2:
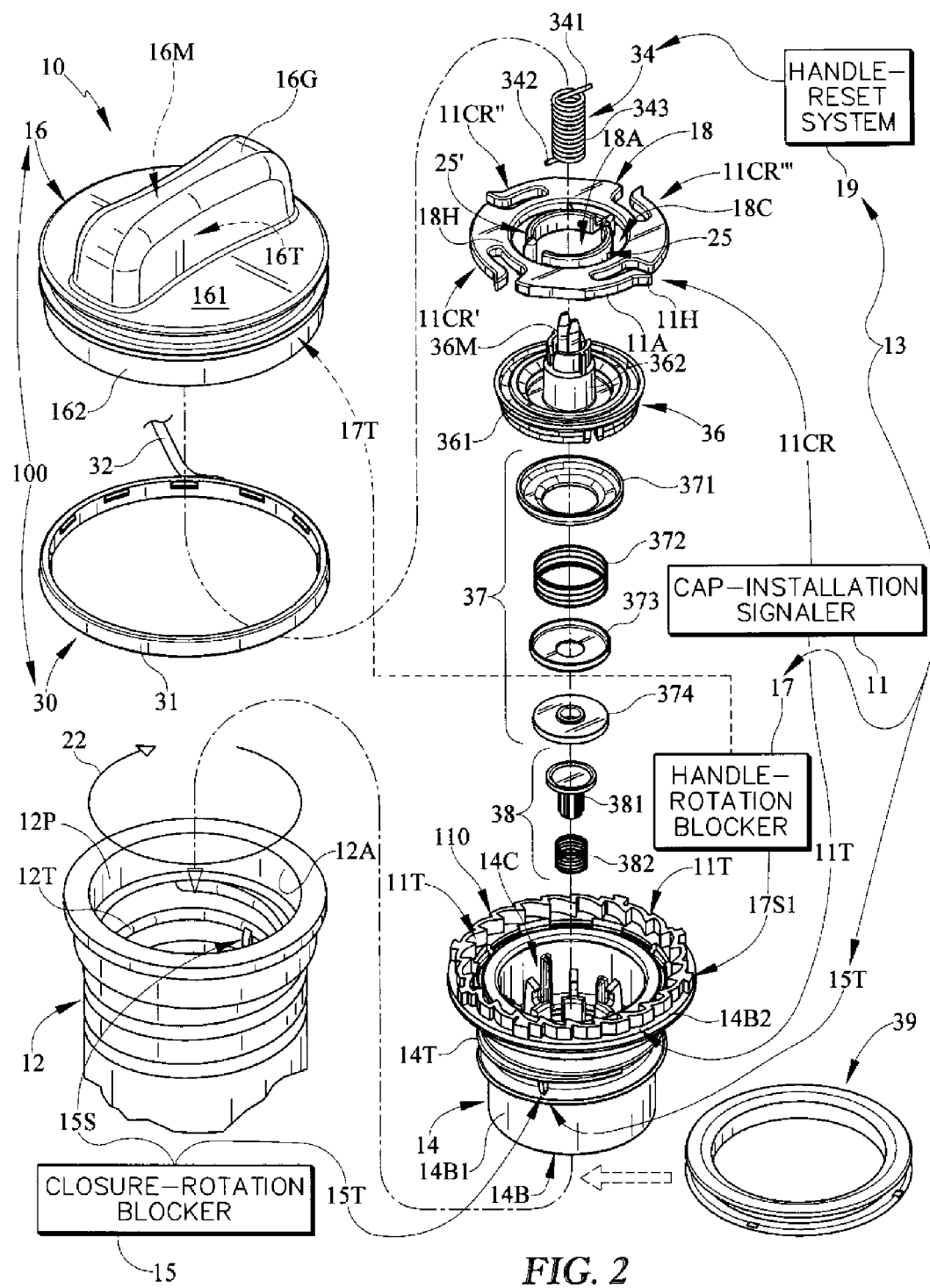
FIG. 2 is an exploded perspective assembly view of a filler neck cap in accordance with a first embodiment of the present disclosure and a partial perspective view of a companion fuel tank filler neck showing that the filler neck cap includes (from top to bottom) an outer handle, a handle tether unit including a tether ring and a tether strap coupled to the tether ring, a torsion spring, a torque-transmission member including a hub and four radially outwardly extending deflectable closure rotators cantilevered to an outer portion of the hub, a torsion spring retainer included in a filler-neck closure, a pressure-relief system comprising a cover plate, a pressure-relief spring, a seal plate, and a sealing gasket, and a vacuum-relief system comprising a vacuum-relief valve and a vacuum-relief spring base included in the filler-neck closure sized to receive the pressure/vacuum-relief systems in a central cavity formed therein and carry a ring of radially inwardly extending torque teeth also included in the filler-neck closure and arranged to mate with the four deflectable closure rotators included in the torque-transmission member, and an O-ring seal sized to mount on an exterior portion of the closure.

A filler-neck closure system in accordance with the present disclosure includes filler neck cap 10 and a closure-rotation blocker 15 comprising an anti-rotation stop 15S coupled to filler neck 12 and a rotation-inhibitor tab 15T included in closure 14 and coupled to a base 14B included in closure 14 of filler neck cap 10 to rotate therewith about axis of rotation 20 as suggested in FIGS. 1 and 2. During installation of filler neck cap 10 into filler neck 12, cap 10 will be turned in cap-advancing (clockwise) direction 22 about axis of rotation 20 by a cap installer until the outwardly extending rotation-inhibitor tab 15T engages the inwardly extending anti-rotation stop 15S to provide a HARD STOP for closure 14 and block further rotation of closure 14 in filler neck 12 without, however, blocking continued rotation of outer handle 16 about axis of rotation 20 in cap-advancing (clockwise) direction 22 relative to the now-stationary closure 14.

A handle-rotation blocker 17 is also included in filler neck cap 10 as suggested in FIGS. 1, 2, and 5. Handle-rotation blocker 17 includes a first anti-rotation stop 17S1 coupled to base 14B of closure 14 and a first rotation-inhibitor tab 17T1 coupled to outer handle 16 to rotate therewith about axis of rotation 20. During installation of filler neck cap 10 into filler neck 12, closure 14 will be rotated about axis of rotation 20 until it reaches a stationary filler-neck closing position determined by the HARD STOP established by closure-rotation blocker 15. However, outer handle 16 is free to be rotated further in cap-advancing (clockwise) direction by the cap installer as suggested in FIGS. 8-13 until the inwardly extending first rotation-inhibitor tab 17T1 engages the outwardly extending first anti-rotation stop 17S1 as shown in FIGS. 12 and 13 to provide a HARD STOP for outer handle 16 and block further rotation of outer handle 16 about axis of rotation 20 in cap-advancing (clockwise) direction 22 relative to closure 14. In an illustrative embodiment, handle rotation blocker 17 also includes a second anti-rotation stop 17S2 coupled to closure 14 (to lie in diametrically opposed relation to first anti-rotation stop 17S1) and a companion second rotation-inhibitor tab 17T2 coupled to outer handle 16 (to lie in diametrically opposed relation to first rotation-inhibitor tab 17T1).

Cap-installation signaler 11 functions after closure 14 has reached its stationary closure hard-stop position and before outer handle 16 reaches its stationary handle hard-stop position to generate a discernable warning signal (e.g., WS1 shown diagrammatically in FIGS. 8 and 9) to provide an audible noise and/or a tactile sensation to alert the cap installer turning outer handle 16 that closure 14 has already seated in filler neck 12 and arrived at a stationary filler neck-closing position. This informs the cap installer that continued rotation of outer handle 16 in cap-advancing (clockwise) direction is not necessary. However, in illustrative embodiments, it is within the scope of the present disclosure to configure cap-installation signaler 11 to generate, in sequence, two or more additional discernable warning signals (e.g., WS2 in FIGS. 10 and 11 and WS3 in FIGS. 12 and 13) to provide further discrete alerts to the cap installer that closure 14 has already seated in filler neck 12 and arrived at the stationary filler neck-closing position.

In accordance with the present disclosure, a cap designer can customize filler neck cap 20 at the design stage easily to meet the needs of a vehicle manufacturer to establish any desired number of discernable warning signals that can be produced by a user during rotation of outer handle 16 from a ready-to-install position to a stationary handle hard-stop position as filler neck cap 20 is installed in filler neck 12. The maximum number of discernable warning signals that can be produced during a single cap-installation activity is equal to the number of torque teeth 11T provided by the fuel cap designer in the signal-generation zone 11Z as suggested in FIG. 5. In the illustrated example, three torque teeth 11T1, 11T2, and 11T3 are provided in signal-generation zone 11Z. Thus, a series of three discernable warning signals WS1, WS2, and WS3 can be produced during cap installation as suggested in FIGS. 6-13.

In illustrative embodiments, each of the discernable warning signals WS1, WS2, and WS3 is generated each time a radially outwardly extending drive head 11H carried on an elastic spring arm 11A included in a deflectable closure rotator 11CR of torque-transmission member 18 contacts the ramped surface 11TR and then passes over and snaps past one of the radially inwardly extending torque teeth 11T included in closure 14 when a cap installer rotates outer handle 16 in cap-advancing (clockwise) direction 22 about axis of rotation 20 relative to the stationary closure 14 seated in the filler neck-closing position in filler neck 12 as suggested, for example, in FIGS. 8, 10, and 12. In illustrative embodiments, deflectable closure rotator 11CR of torque-transmission member 18 and torque teeth 11T of closure 14 cooperate to define a cap-installation signaler 11 as suggested diagrammatically in FIG. 2.

Figure 3:
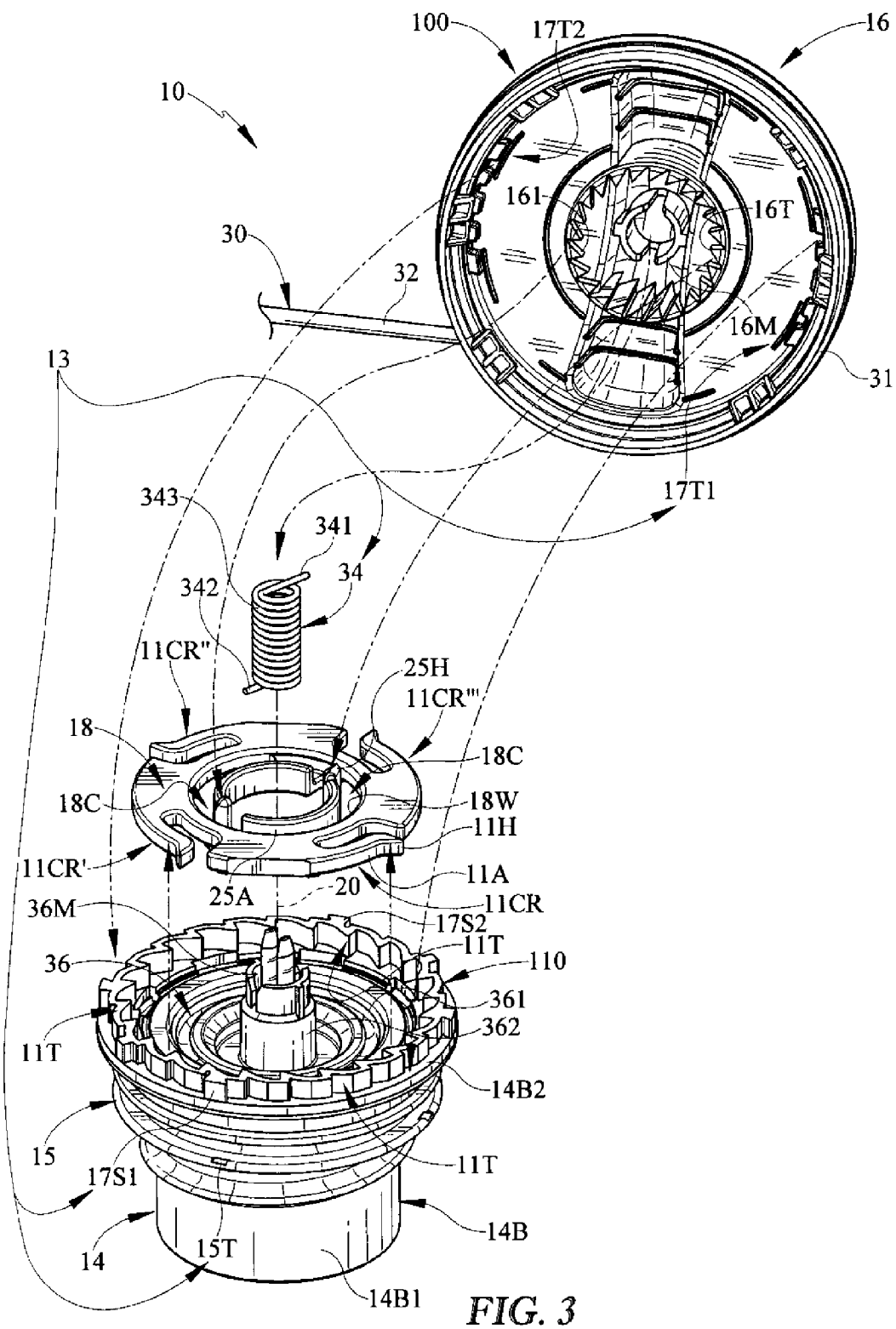
FIG. 3 is an exploded perspective assembly view of the filler neck cap of FIGS. 1 and 2 showing the closure, a torsion spring retainer mounted in a center portion of the closure and surrounded by the ring of radially inwardly extending torque teeth included in the closure, the torque-transmission member above the closure, the torsion spring above the torque-transmission member, and a closure cover including the outer handle and the handle tether unit coupled to the outer handle and illustrating the underside of the outer handle to show that the outer handle is formed to include a smaller ring of radially inwardly extending torque teeth arranged to mate with radially outwardly extending heads included in the two curved deflectable ratchet arms arranged to lie inside the circular hub provided in the center of the torque-transmission member.

Filler neck cap 10 includes a closure 14 adapted to close filler neck 12, an outer handle 16 arranged to overlie closure 14 and rotate relative to closure 14, and a torque-transmission member 18 having a peripheral portion 11CR coupled to closure and an inner portion 25 coupled to the underside of outer handle 16 to rotate therewith about an axis of rotation 20 relative to filler neck 12 during installation of filler neck cap 10 in filler neck 12 as suggested in FIGS. 1-3. During cap installation, a cap installer inserts base 14B of closure 14 of filler neck cap 10 into fuel-conducting passageway 12P as suggested in FIG. 1 to cause a thread 14T on base 14B of closure 14 to engage a companion thread 12T formed in filler neck 12 so that closure 14 can be rotated about axis of rotation 20 until it assumes a filler-neck closing (hard stop) position established, for example, by engagement of rotation-inhibitor tab 15T in closure 14 and anti-rotation stop 15S coupled to filler neck 12.

Figure 4:
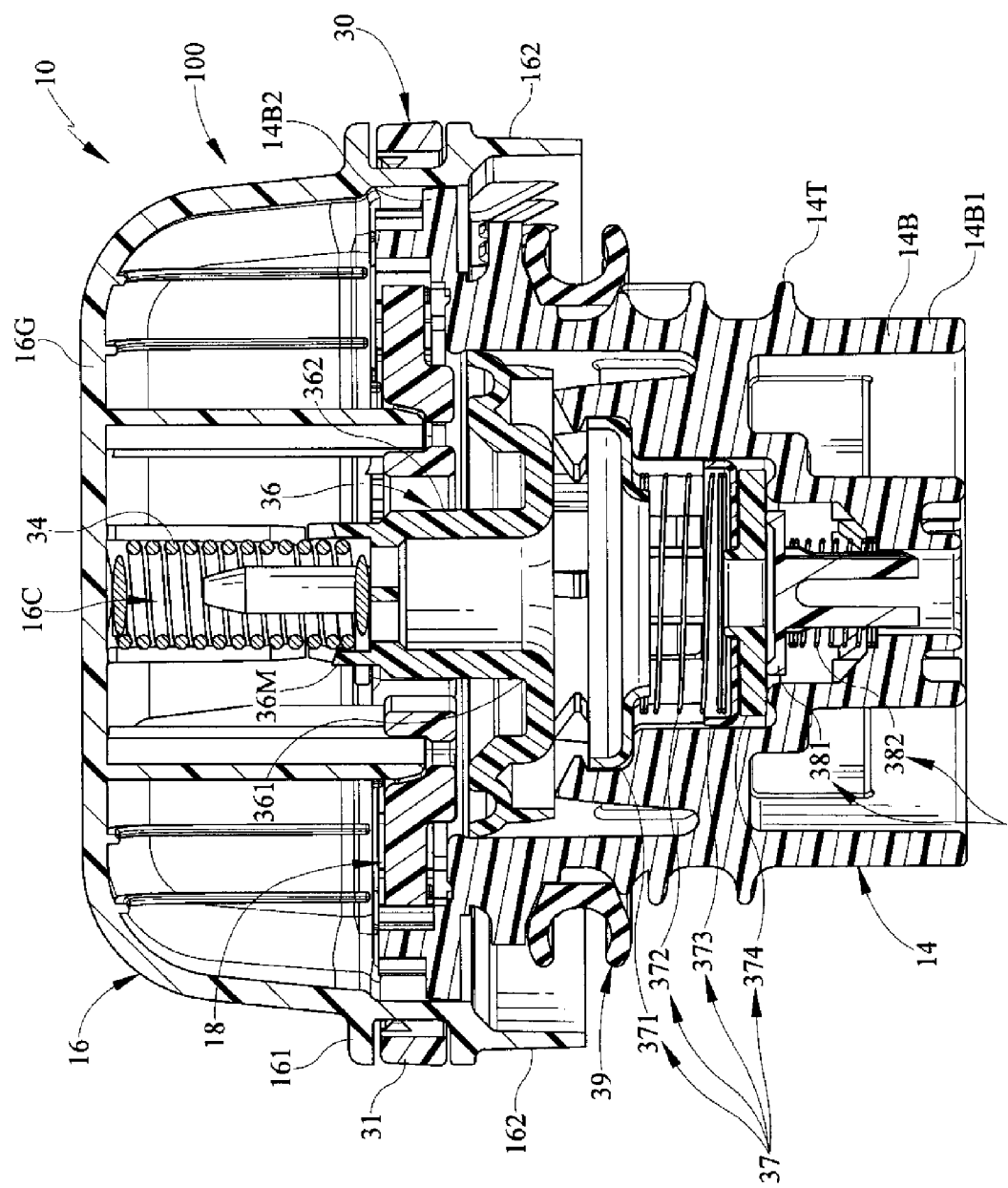
FIG. 4 is an enlarged sectional view of the filler neck cap taken along line 4-4 of FIGS. 1 and 5.

Once closure 14 engages filler neck 12, the cap installer rotates outer handle 16 in cap-advancing (clockwise) direction 22 about axis of rotation 20 to cause torque-transmission member 18 to rotate about axis of rotation 20 to cause closure rotator 11CR to apply a rotation-inducing torque to the inclined ramp surface 11TR of one of the torque teeth 11T included in a torque receiver 11O provided in closure 14 while closure 14 is engaged to filler neck 12 as suggested in FIGS. 6 and 7. Closure 14 is then rotated about axis of rotation 20 until a rotation-inhibitor tab 15T included in a closure-rotation blocker 15 and coupled to closure 14 mates with a stationary anti-rotation stop 15S also included in closure-rotation blocker 15 and coupled to filler neck 12 as suggested in FIG. 1. Engagement of rotation-inhibitor tab 15T and anti-rotation stop 15S provides a HARD STOP to establish the stationary closure hard-stop position of closure 14 in filler neck 12 so that closure 14 is not able to rotate further in fuel-conducting passageway 12P relative to filler neck 12 in response to continued rotation by a cap installer of outer handle 16 and torque-transmission member 18 in cap-advancing (clockwise) direction 22. Closure 14 has now arrived at a stationary filler-neck closing position and an O-ring seal 39 coupled to closure 14 as suggested in FIGS. 3 and 4 is trapped between closure 14 and filler neck 12.

Further rotation of closure 14 in cap-advancing (clockwise) direction 22 stops (i.e., a hard stop) once closure 14 has arrived at the filler-neck closing position in filler neck 12 as suggested in FIG. 6. However, outer handle 16 is free to be rotated further by the cap installer relative to the stationary closure 14 through a small angle to actuate cap-installation signaler 11 to produce one or more discernable warning signals (represented by THUNDERBOLT SYMBOLS WS1, WS2, and WS3) as suggested in FIGS. 8-13. Upon sensing the discernable warning signal, the cap installer will understand that closure 14 has already arrived at the filler-neck closing position and ceased to rotate further relative to filler neck 12, filler neck cap 10 has been installed properly, and that the cap installer can ungrip outer handle 16. A cap installer receiving one or more of the discernable warning signals WS1, WS2, WS3 in accordance with the present disclosure will understand that continued rotation of outer handle 16 in cap-advancing (clockwise) direction 22 (though possible) is not needed. In illustrative embodiments, second and third (or any selected number of) discernable warning signals WS2, WS3 are provided in accordance with the present disclosure in case one or more signals is overlooked by the cap installer.

Handle-rotation blocker 17 operates to block further rotation of outer handle 16 about axis of rotation 20 relative to closure 14 after each of the discernable warning signals WS1, WS2, and WS3 has been produced. Rotation-inhibitor tab 17T1 included in outer handle 16 engages anti-rotation stop 17S1 included in closure 14 to establish the stationary handle hard-stop position of outer handle 16 and block further rotation of outer handle 16 about axis of rotation 20 relative to closure 14 in the cap-advancing (clockwise) direction 27.

Outer handle 16 is gripped by a cap installer and rotated about an axis of rotation 20 in a cap-advancing (clockwise) direction 22 to cause closure 14 to rotate about axis of rotation 20 until closure 14 reaches a filler-neck closing position in fuel tank filler neck 12. Once closure 14 has reached the filler-neck closing position, outer handle 16 can be rotated a bit more in cap-advancing (clockwise) direction 22 until a radially outwardly extending drive head 11H appended to an elastic spring arm 11A in deflectable closure rotator 11CR included in torque-transmission member 18 contacts and then passes over and snaps past one or more radially inwardly extending torque teeth 11T included in signal-generation zone 11Z provided in closure 14 to produce a discernable warning signal (e.g., an audible clicking sound and/or a tactile sensation). The radial design of closure rotator 11CR and torque teeth 11T cooperate to minimize variation in torque magnitude and enhance flexibility in adjusting click audible and physical warning signal magnitude and tone to a cap installer. Audible (click) and tactile warning signals (snap of closure rotator 11CR past torque tooth 11T and/or hard stop of handle 16) are provided to the cap installer when filler neck cap 10 is installed in filler neck 12. Torque-transmission member 18 includes four closure rotators 11CR, 11CR, 11CR, and 11CR as shown, for example, in FIG. 2A.

As suggested in FIG. 2, filler neck cap 10 includes outer handle 16, a handle tether unit 30, a torsion spring 34, toque-transmission member 18, torsion spring retainer 36 included in closure 14, pressure-relief system 37, vacuum-relief system 38, a base 14B included in closure 14, and an O-ring seal 39. Torsion spring retainer 36 is configured to mate with base 14B to contain pressure-relief and vacuum-relief systems 37, 38 in a chamber 14C formed in base 14B of closure 14 as suggested in FIGS. 3 and 4. Pressure-relief system 37 includes a cover plate 371, a pressure-relief spring 372, a seal plate 373, and a sealing gasket 374 in an illustrative embodiment. Vacuum-relief system 38 includes a vacuum-relief valve 381 and a vacuum-relief spring 382 in an illustrative embodiment.

Handle tether unit 30 includes a tether ring 31 and a tether strap 32 coupled to tether ring 31. Tether ring 31 is coupled to outer handle 16 as suggested in FIGS. 2 and 3. Outer handle 16 and tether unit 30 mate to form a closure cover 100 as suggested in FIG. 3 that is configured to cover closure 14 as suggested in FIGS. 1 and 4.

Outer handle 16 is formed to include a small ring of radially inwardly extending torque teeth 16T visible on the underside of outer handle 16 as suggested in FIG. 3. Outer handle 16 also includes an upper spring mount 16M configured to mate with an upper tang 341 of torsion spring 34 as suggested in FIGS. 1 and 3. The ring of torque teeth 16T is arranged to surround upper spring mount 16M. Each torque tooth 16T has an inclined ramp surface and a vertical flat surface as suggested in FIG. 3.

Base 14B of closure 14 includes a torque receiver 110 defined by a relatively larger ring of radially inwardly torque teeth 11T as shown, for example, in FIG. 3. Torque spring retainer 36 is mounted in a center portion of base 14B of closure 14 so as to be surrounded by the ring of torque teeth 11T as shown in FIG. 3. Torque spring retainer 36 includes a web 361 coupled to closure 14 and an upwardly extending post 362 coupled to web 361 and formed to include a lower spring mount 36M configured to mate with a lower tang 342 of torsion spring 34 as suggested in FIGS. 1 and 3. Torsion spring 34 includes a coil 343 arranged to interconnect upper and lower tangs 341, 342 as suggested in FIGS. 1-4.

Ratchet arms 25 and 25 included in torque-transmission member 18 are configured to mate with torque teeth 16T included in outer handle 16 to allow outer handle 16 to engage torque-transmission member 18 and lock torque-transmission member 18 to outer handle 16 to provide means for transferring torque applied by the cap installer from outer handle 16 to torque-transmission member 18 so that torque-transmission member 18 rotates (at the proper time) in response to rotation of outer handle 16. Ratchet arms 25, 25 cooperate to allow outer handle 16 to be reset automatically in relation to closure 14 to the ready-to-install position using torsion spring 34 so that torque teeth 11T1, 11T2, and 11T3 are provided once again in signal-generation zone 11Z to be engaged by deflectable closure rotator 11CR to apply torque to closure 14 via torque-transmission member 18 and to produce a discernable warning signal.

Figure 2A:
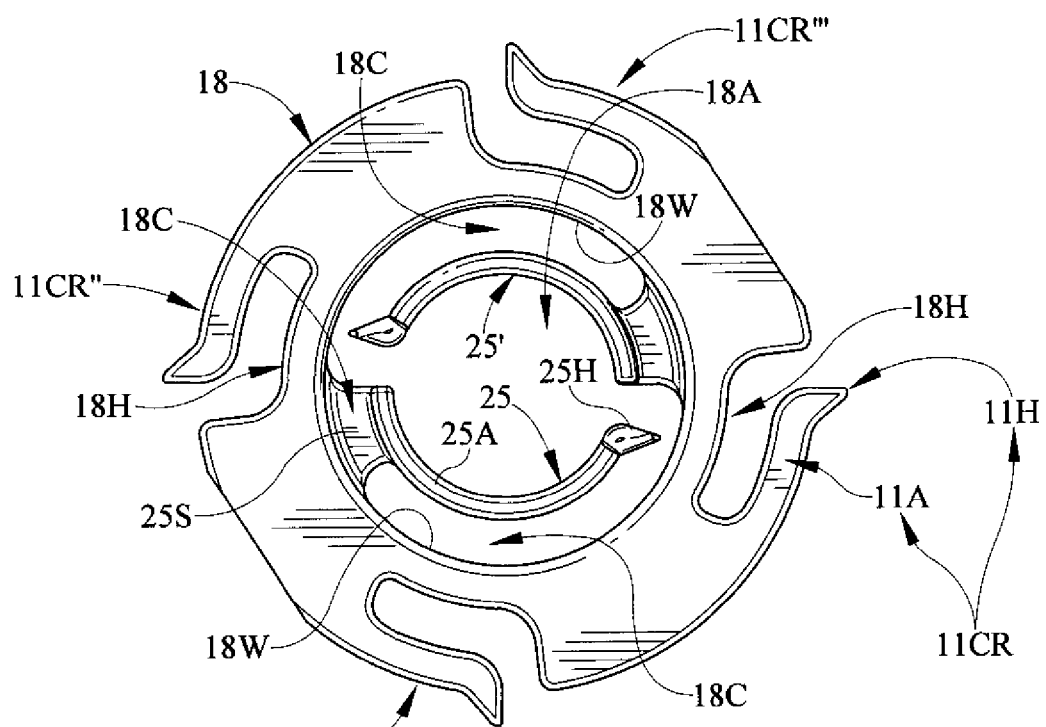
FIG. 2A is an enlarged top plan view of the torque-transmission member shown in FIGS. 1 and 2 showing that the torque-transmission member includes a circular hub, four deflectable closure rotators coupled to an outer portion of the circular hub and adapted to mate with companion torque teeth included in the closure, and two deflectable ratchet arms coupled to an inner portion of the circular hub and adapted to mate with companion torque teeth included in the outer handle to transmit torque that has been applied by a cap installer to the outer handle from the outer handle to the torque-transmission member.
Figure 2B:
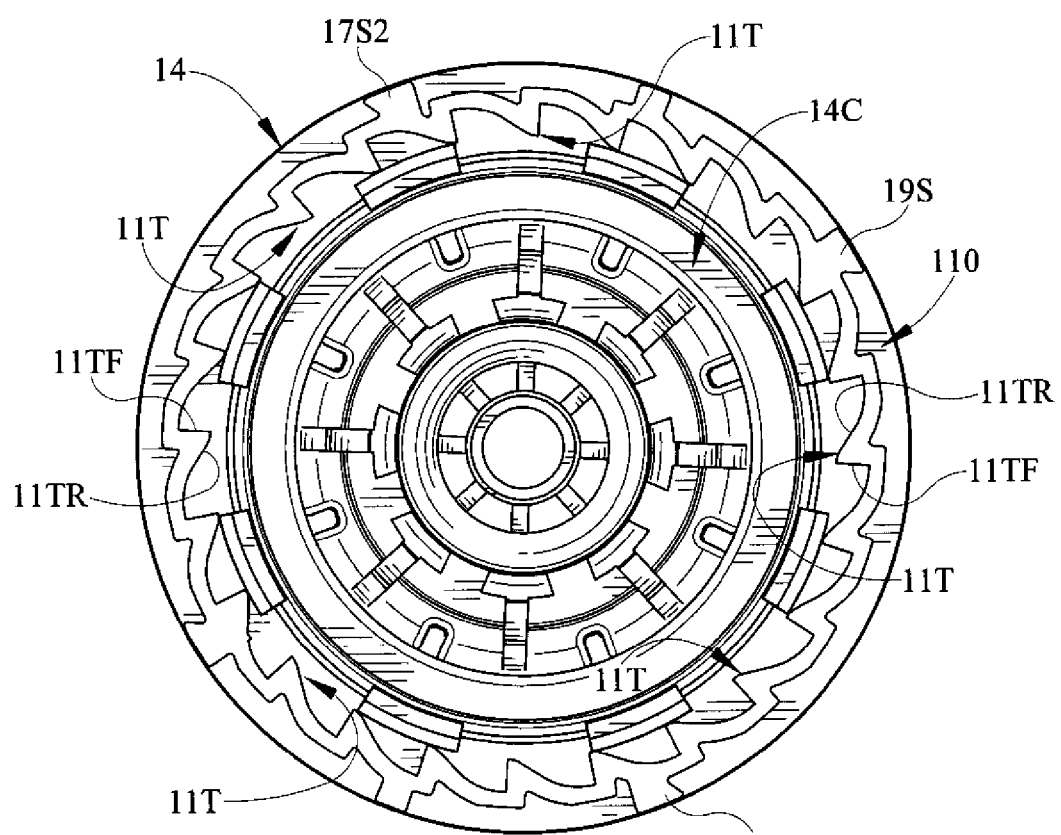
FIG. 2B is an enlarged top plan view of the closure shown in FIGS. 1 and 2 showing that a perimeter portion of the closure includes a ring of radially inwardly extending torque teeth arranged to mate with radially outwardly extending drive heads included in the four deflectable closure rotators of the torque-transmission member shown in FIG. 2A in a manner suggested in FIG. 3 and shown in FIG. 5.

Each ratchet arm 25, 25 of torque-transmission member 18 includes a radially outwardly extending drive head 25H coupled to a curved elastic spring arm 25A that is cantilevered to an arm support 25S coupled to central hub 18H of torque-transmission member 18 as shown, for example, in FIG. 2A. Each drive head 25H is configured and arranged to engage the inclined ramp surfaces on torque teeth 16T during cap installation and the vertical flat surfaces on torque teeth 16T during cap removal. In an illustrative embodiment, companion curved elastic spring arm 25A, arm support 25S, and a curved inner wall 18W of central hub 18H cooperate to form a curved tooth-receiving channel 18C as suggested in FIG. 2A sized to receive torque teeth 16T of outer handle 16 therein when outer handle 16 is mated to torque-transmission member 18 as suggested in FIGS. 3 and 5.

After closure 14 reaches the filler-neck closing position (hard stop) in filler neck 12, the deflectable closure rotator 11CR is deflected to provide a torque-override function and generate a discernable warning signal such as a clicking sound. In addition to the torque transfer between outer handle 16 and torque-transmission member 18, ratchet arms 25, 25 in torque-transmission member 18 allow handle 16 to engage torque-transmission member 18 and to reset outer handle 16 (and its rotation-inhibitor tab 17T1) to its original location relative to closure 14 to allow cap 10 to be clicked again or removed. Reset action in accordance with the present disclosure can be manual or automated (use of torsion or other wound spring).

Filler neck cap 10 includes a closure 14 configured to mate with filler neck 12 and close an inlet aperture 12A opening into a fuel-conducting passageway 12P formed in filler neck 12 as suggested in FIGS. 1 and 2. Filler neck cap 10 also includes a rotatable outer handle 16 and a torque-transmission member 18 arranged to lie under handle 16 and rotate in a cap-advancing (clockwise) direction 22 with handle 16 during installation of filler neck cap 10 in filler neck 12.

Torque-transmission member 18 is configured to include a hub 18H and a deflectable closure rotator 11CR cantilevered to hub 18H and arranged to engage torque teeth 11T included in closure 16 normally to transmit torque from torque-transmission member 18 to closure 14 during installation of cap 10 in filler neck 12 to cause closure 14 to rotate in filler neck 12 in response to rotation of outer handle 16 relative to filler neck 12. After closure 14 has arrived at a stationary filler-neck closing position and during rotation of outer handle 16 relative to the stationary closure 14 in the latter stage of a cap-installation activity, head 11H of deflectable closure rotator 11CR is moved over and past each of the radially inwardly extending torque teeth 11T to produce the discernable warning signal WS1, WS2, and WS3. In an illustrative embodiment, a clicking sound and tactile sensation is provided each time the head is moved over and past one of torque teeth 11T.

Deflectable closure rotator 11CR is configured to engage the inclined ramp 11TR of one of torque teeth 11T included in closure 14 to transmit torque from outer handle 16 to closure 14 as outer handle 16 is rotated about axis of rotation 20 relative to filler neck 12 during installation of filler neck cap 10 in fuel tank filler neck 12. If the cap installer continues to apply a rotation-inducing torque to handle 16 in cap-advancing (clockwise) direction 22 after closure 14 arrives at a filler-neck closing position in filler neck 12 and stops rotating due to engagement of a rotation-inhibitor tab 15T coupled to closure 14 with an anti-rotation stop 15S coupled to filler neck 12 to provide a HARD STOP, then deflectable closure rotator 11CR is moved radially inwardly relative to hub 18H from a torque-transmission position to a deflected position due to camming engagement of deflectable closure rotator 11CR on an inclined ramp 11TR provided on torque tooth 11T so that rotation-inducing torque is no longer transmitted from the rotating torque-transmission member 18 and its deflectable closure rotator 11CR to closure 14. Thus, transmission of torque from torque-transmission member 18 to closure 14 is stopped once closure 14 reaches a stationary filler-neck closing position in filler neck 12 due to the torque-limited engagement of deflectable closure rotator 11CR and torque teeth 11T in closure 14 even though a cap installer may continue to rotate outer handle 16 and torque-transmission member 18 together (as a unit) about axis of rotation 20 relative to closure 14 and filler neck 12 in cap-advancing (clockwise) direction 22.

Deflectable closure rotor 11CR and torque teeth 11T included in filler neck cap 10 cooperate during installation of cap 10 in filler neck 12 to produce a discernable warning signal (e.g., audible sound and/or tactile sensation) to alert a cap installer turning cap 10 in a cap-advancing (clockwise) direction 22 in filler neck 12 that closure 14 has stopped rotating and seated in a filler-neck closing position in filler neck 12. Inclined ramps 11TR on one or more radially inwardly extending torque teeth 11T included in closure 14 are arranged to intercept and cooperate with a radially outwardly extending head 11H coupled to an elastic spring arm 11A included in deflectable closure rotator 11CR of torque-transmission member 18 first to transmit torque from torque-transmission member 18 to closure 14 during rotation of closure 14 in filler neck 12 and then to provide the discernable warning signal once closure 14 arrives at the stationary filler neck 12. The radially outwardly extending head of deflectable closure rotator 11CR is moved over and past each of the stationary radially inwardly extending torque teeth 11T during rotation of handle 16 and torque-transmission member 18 in cap-advancing (clockwise) direction 22 relative to the stationary closure 14 to produce a discernable warning signal to alert a cap installer that closure 14 has already arrived at the filler-neck closing position in filler neck 12 and that it is no longer necessary to continue to rotate handle 16 in cap-advancing (clockwise) direction 22.

Filler neck cap 10 further includes a handle-rotation blocker 17 including an anti-rotation stop 17S1 coupled to closure 14 to rotate therewith and a rotation-inhibitor tab 17T1 coupled to outer handle 16 to rotate therewith. During the latter stages of a cap-installation activity after one or more discernable warning signals have been generated, the rotation-inhibitor tab 17T1 can be moved toward and mated with the anti-rotation stop 17S1 during continued rotation of outer handle 16 and torque-transmission member 18 relative to stationary closure 14 to block further rotation of outer handle 16 in the cap-advancing (clockwise) direction 22 relative to closure 14 and provide a HARD STOP for outer handle 16.

In use, rotation-inhibitor tab 17T1 coupled to outer handle 16 is always arranged to lie in circumferentially spaced-apart relation to anti-rotation stop 17S1 that is coupled to closure 14 when closure 14 arrives and stops at the filler-neck closing position in filler neck 12. Even though rotation of closure 14 in filler neck 12 has stopped, the cap installer is free to continue to rotate outer handle 16 about the axis of rotation 20 relative to the stationary closure 14 to produce one or more discernable warning signals WS1, WS2, WS3 until rotation-inhibitor tab 17T1 on outer handle 16 is moved relative to stationary closure 14 along a curved path to mate with anti-rotation stop 17S1 on closure 14 so that further rotation of outer handle 16 about axis of rotation 20 relative to closure 14 is blocked.

By selecting the number of torque teeth 11T and establishing the length of the curved path traveled by rotation-inhibitor tab 17T1 coupled to outer handle 16 until it mates with anti-rotation stop 17S1 coupled to the stationary closure 14 during the design of a filler neck cap 10 in accordance with the present disclosure, it is possible for a fuel cap designer to create one, two, three, or more clicks or other discernable warning signals (WS) to alert the cap installer that closure 14 has arrived at the filler-neck closing position in filler neck 12 and that it is no longer necessary to continue to rotate outer handle 16 (and torque-transmission member 18) in cap-advancing (clockwise) direction 22. Mating engagement of rotation-inhibitor tab 17T 1 and anti-rotation stop 17S1 provides a HARD STOP for outer handle 16 to block further rotation of outer handle 16 about axis of rotation 20 relative to the stationary closure 14 in cap-advancing (clockwise) direction 22 in case the cap installer ignores the discernable warning signal (WS) provided by the operation of the cap-installation signaler 11 defined by deflectable closure rotator 11CR and companion radially inwardly extending torque teeth 11T.

A series of views of filler neck cap 10 during removal of filler neck cap 10 from filler neck 12 is shown, for example, in FIGS. 14-19. As suggested in FIG. 14, a counterclockwise torque has been applied to outer handle 16 to urge direction 23 to cause a flat driver face on head 17H of deflectable closure rotator 11CR to mate with companion flat driven face on the third torque tooth 11T to prepare closure 14 to be rotated in a cap-removal (counterclockwise) direction 23 relative to filler neck 12 during a process of removing filler neck cap 10 from filler neck 10. As suggested in FIG. 16, closure 14 is turning in filler neck 12 in response to rotation of outer handle 16 in the cap-removal (counterclockwise) direction 23 and application of a rotation-inducing torque from the deflectable closure rotators 11CR to torque teeth 11T of torque receiver 110 in closure 14. FIG. 18 is a top plan view similar to FIG. 16 after the filler neck cap has been removed from the filler neck. FIG. 19 is a view similar to FIG. 18 with most of outer handle 16 removed and showing that torsion spring 34 (that had been loaded during the cap-installation process) was freed and able to unload as soon as filler neck cap 10 was removed from filler neck 12.

A filler neck cap 10 having a cap-installation management system is provided for a filler neck 12 as suggested in FIG. 1. Filler neck cap 10 includes an outer handle 16 rotatable about an axis of rotation 20 and a closure 14 including a base 14B adapted to close filler neck 12 and a torque receiver 10 coupled to base 14B and arranged to lie in spaced-apart relation to axis of rotation 20 as suggested in FIGS. 1 and 2. Torque receiver 110 includes several torque teeth 11T as suggested in FIGS. 1 and 3.

Filler neck cap 10 further includes a torque-transmission member 18 rotatable about axis of rotation 20 as suggested in FIGS. 5-19. Torque-transmission member 18 is positioned to lie between outer handle 16 and closure 14 and coupled to outer handle 16 to rotate therewith during rotation of outer handle 16 about axis of rotation 20 in a cap-advancing direction 22 as suggested in FIGS. 6-13. Torque-transmission member 18 includes a central hub 18H surrounding axis of rotation 20 and a deflectable closure rotator 11CR arranged to engage torque teeth 11T included in torque receiver 110 to transmit torque from torque-transmission member 18 to closure 14 during installation of base 14B of closure 14 in filler neck 12 to cause base 14B to rotate in filler neck 12 in response to rotation of outer handle 16 in cap-advancing direction 22 relative to filler neck 12.

Filler neck cap 10 also includes handle-rotation travel limiter 13 including a closure-rotation inhibitor tab 15T, a handle-rotation blocker 17, and a handle-reset system 19 in an illustrative embodiment as suggested in FIGS. 2 and 3. Handle-rotation travel limiter 13 is configured to provide means for producing a predetermined number of separate discernable warning signals (WS) generated by engagement and subsequent disengagement of deflectable closure rotator 11CR and torque teeth 11T included in torque receiver 110 of closure 14 after base 14B of closure 14 is rotated about axis of rotation 20 in cap-advancing direction 22 to reach a closure hard-stop position (FIGS. 6 and 7) in filler neck 12 and cease further rotation in cap-advancing direction 22 and before outer handle 16 is rotated from an initial position (FIGS. 5-7) about axis of rotation 20 in cap-advancing direction 22 relative to closure 14 in the closure hard-stop position (FIGS. 6 and 7) to reach a handle hard-stop position (FIGS. 12 and 13) and cease further rotation in cap-advancing position 22 relative to closure 14 so that continued rotation of outer handle 16 about axis of rotation 20 in cap-advancing direction 22 after closure 14 has reached the closure hard-stop position (FIGS. 6 and 7) causes at most the predetermined number of separate discernable warning signals (WS) to be produced before outer handle 16 is rotated about axis of rotation 20 in cap-advancing direction 22 relative to base 14B of closure 14 to reach the handle hard-stop position (FIGS. 12 and 13).

Handle-rotation travel-limit means 13 includes an anti-rotation stop 17S1 coupled to closure 14 to rotate therewith and a rotation-inhibitor tab 17T1 coupled to outer handle 16 to rotate therewith and to engage anti-rotation stop 17S1 to block further rotation of outer handle 16 in cap-advancing direction 22 relative to closure 14 that is stationary in the closure hard-stop position (FIGS. 6 and 7) when outer handle 16 reaches handle hard-stop position (FIGS. 12 and 13). Anti-rotation stop 17S1 is arranged to lie in spaced-apart relation to torque-transmission member 18 to locate a portion of torque receiver 110 therebetween as suggested in FIG. 5. Torque receiver 110 is arc-shaped as suggested in FIG. 5 and includes a series of circumferentially spaced-apart tooth mounts 11M and each torque tooth 11T is coupled to a pair of adjacent tooth mounts 11M and arranged to extend radially inwardly toward axis of rotation 20 to engage deflectable closure rotator 11CR during rotation of torque-transmission member 18 about axis of rotation 20 relative to closure 14. Anti-rotation stop 17S1 is coupled to one of the tooth mounts 11M as suggested in FIG. 5.

Base 14B of closure 14 includes a barrel 14B1 arranged to extend axially along axis of rotation 20 and an annular plate 14B2 coupled to an upper end of barrel 14B1 and arranged to lie in a position between barrel 14B1 and a top wall 161 of outer handle 16 as suggested in FIGS. 1, 4, and 6. Torque receiver 110 is coupled to an upwardly facing surface of annular plate 14B2 and arranged to extend upwardly away from barrel 14B1 and to surround torque-transmission member 18 as suggested in FIGS. 1 and 2. Each torque tooth 11T is arranged to extend in a radially inward direction toward axis of rotation 20 as suggested in FIG. 5.

Anti-rotation stop 17S1 of handle rotation blocker 17 is coupled to the upwardly facing surface of annular late 14B2 as suggested in FIGS. 3 and 5. Anti-rotation stop 17S1 is also coupled to one of torque teeth 11T and arranged to extend in a radially outward direction away from axis of rotation 20. Outer handle 16 includes a top wall 161 arranged to overlie torque-transmission member 18 and a side wall 162 coupled to a peripheral portion of top wall 161 and arranged to surround a perimeter edge of top plate 14B2 to locate anti-rotation stop 17S1 in a space provided between torque receiver 110 and side wall 162 of outer handle 16. Rotation-inhibitor tab 17T1 is coupled to side wall 162 to extend in a radially inward direction toward axis of rotation 20 and is arranged to mate with anti-rotation stop 17S1 in response to rotation of outer handle 16 to the handle hard-stop position (FIGS. 12 and 13) when base 14B of closure 14 is in the closure hard-stop position (FIGS. 6 and 7).

A torque tooth 11T (e.g., three tongue teeth 11T1-3) included in torque receiver 110 is positioned to lie between rotation-inhibitor tab 17T1 and torque-transmission member 18 once outer handle 16 is rotated to reach the handle hard-stop position (FIGS. 12 and 13). Anti-rotation stop 17S1 is positioned to lie between torque receiver 110 and side wall 162 of outer handle 16.

Handle-rotation travel limiter 13 further includes handle-reset means 19 for automatically rotating closure 14 about axis of rotation 20 relative to outer handle 16 in a cap-removal direction 22 opposite to cap-advancing direction 23 while a user is gripping outer handle 16 as soon as base 14B of closure 14 is separated from filler neck 12 during a cap-removal activity to move rotation-inhibitor tab 17T1 to a ready-to-install initial position (FIGS. 6 and 7) and establish a predetermined arcuate distance between the anti-rotation stop 17S1 coupled to closure 14 and rotation-inhibitor tab 17T1 to cause a number of torque teeth 11T included in torque receiver 110 that is equal to the predetermined number of separate discernable warning signals (WS) to lie in a signal-generation zone 11Z provided between anti-rotation stop 17S1, rotation-inhibitor tab, and axis of rotation 20 so that deflectable closure rotator 11CR will engage and subsequently disengage said number of torque teeth 11T during movement of rotation-inhibitor tab 17T1 relative to base 14B of closure 14 from the initial position (FIGS. 6 and 7) to the handle hard-stop position (FIGS. 12 and 13).

Handle-reset means 19 includes a torsion spring 34 including an upper tang 341 coupled to outer handle 16, a lower tang 343 coupled to closure 14, and a coil 342 arranged to wind around axis of rotation 20 to interconnect upper and lower tanks 341, 343. Closure 14 includes a torsion spring retainer 36 coupled to base 14B to form a chamber 14C therebetween. A pressure-relief system 37 and a vacuum-relief system 38 also included in filler neck cap 10 is located in chamber 14C. Torsion spring retainer 36 includes a web 361 coupled to base 14B to define chamber 14C therebetween and an upwardly extending post 362 coupled to web 361. Upwardly extending post 362 is arranged to extend upwardly away from web 361 along axis of rotation 20 through a central aperture 18A formed in torque-transmission member 18 to mate with lower tang 343 of torsion spring 34.

Outer handle 16 further includes a hollow hand grip 16G coupled to top wall 161 at an opening formed in top wall 161 and arranged to extend upwardly away from base 14B as suggested in FIGS. 1 and 4. Torsion spring 34 is located in a hollow chamber 16C formed in hollow hand grip 16G as suggested in FIGS. 1 and 4.

Handle-rotation travel limiter 13 further includes a handle-locator stop and a handle-locator tab 19T as suggested in FIG. 5. Handle-locator stop 19S is coupled to closure 14 and arranged to lie in spaced-apart relation to anti-rotation stop 17S1 to define a tab-travel zone TTZ therebetween as suggested in FIG. 7. Rotation-inhibitor and handle-locator tabs 17T1, 19T are coupled to side wall 162 and arranged to extend radially inwardly toward axis of rotation 20. Rotation-inhibitor tab 17T1 is positioned to lie and move in tab-travel zone (TTZ) relative to closure 14 during rotation of outer handle 16 about axis of rotation 20 from the initial position (FIGS. 6 and 7) to the handle hard-stop position (FIGS. 12 and 13). Handle-locator tab 19T is coupled to outer handle 16 to move therewith and positioned to lie in tab-travel zone (TTZ) between rotation-inhibitor tab 17T1 and handle-locator stop 19T. Handle-locator tab 19T is arranged to engage handle-locator stop 19S coupled to closure 14 during automatic rotation of closure 14 about axis of rotation 20 relative to outer handle 16 in cap-removal direction 23 to establish the initial position (FIGS. 6 and 7) of rotation-inhibitor tab 17S1. Handle-rotation travel limiter means 13 further includes at least one stiffener tab 19ST coupled to outer housing 16 to rotate therewith and located between and in spaced-apart relation to each of the rotation-inhibitor and handle-locator tabs 17T1, 19T to provide means for rigidifying outer handle 16.

Torsion spring 34 is configured to provide handle-reset means for automatically rotating closure 14 about axis of rotation 20 relative to outer handle 16 in a cap-removal direction 23 opposite to cap-advancing direction 22 while a user is gripping outer handle 16 as soon as base 14B of closure 14 is separated from filler neck 12 during a cap-removal activity to cause handle-locator stop 19S to move to engage handle-locator tab 19T to block further rotation of closure 14 relative to outer handle 16 to establish a ready-to-install position of closure 14 relative to outer handle 16 in cap-advancing direction 22 to reach the closure hard-stop position (FIGS. 6 and 7) in filler neck 12 and before outer handle 16 is rotated about axis of rotation 20 in cap-advancing position 20 to reach the handle hard-stop position (FIGS. 12 and 13). Torque receiver 110 includes three torque teeth arranged to be engaged in sequence by deflectable closure rotator 11CR to produce in sequence three separate discernable warning signals WS1, WS2, WS3 during rotation of outer handle 16 relative to closure 14 from the initial position (FIGS. 6 and 7) to the handle hard-stop position (FIGS. 12 and 13).

Closure 14 further includes a closure-rotation inhibitor tab 15T coupled to base 14B to rotate therewith relative to filler neck 12. Closure rotation inhibitor tab 15T is configured to provide means for engaging an anti-rotation stop 15S included in filler neck 12 upon arrival of base 14B of closure 14 at the closure hard-stop position (FIGS. 6 and 7) in filler neck 12 so that further rotation of base 14B about axis of rotation 20 relative to filler neck 12 is blocked during continued rotation of outer handle 16 about axis of rotation in cap-advancing direction 22.

Central hub 18H of torque-transmission member 18 is formed to include a central aperture 18A through which axis of rotation 20 extends as suggested in FIG. 2. Outer handle 16 includes a ring 110 of radially inwardly extending torque teeth 11T. Torque-transmission member 18 further includes a ratchet arm 25 cantilevered at one end thereof to central hub 18H and located in the central aperture 18A formed in central hub 18H to mate with ring 110 of radially inwardly extending torque teeth 11T to provide means for transferring torque applied by a cap installer to outer handle 16 to torque-transmission member 18 so that torque-transmission member 18 rotates relative to outer handle 16 during a cap-installation activity. Ratchet arm 25 is configured to slip and move relative to ring 10 of radially inwardly extending torque teeth 11T without transferring torque between outer handle 16 and torque-transmission member 18 during automatic rotation of closure 14 about axis of rotation 20 relative to outer handle 16 in cap-removal direction 23 in response to torque applied to closure 14 by torsion spring 34 of handle-reset system 19.

The invention claimed is:

1. A filler neck cap having a cap-installation management system for a filler neck, the system comprising an outer handle rotatable about an axis of rotation, a closure including a base adapted to close the filler neck and a torque receiver coupled to the base and arranged to lie in spaced-apart relation to the axis of rotation, the torque receiver including several torque teeth, a torque-transmission member rotatable about the axis of rotation, the torque-transmission member being positioned to lie between the outer handle and the closure and coupled to the outer handle to rotate therewith during rotation of the outer handle about the axis of rotation in a cap-advancing direction, the torque-transmission member including a central hub surrounding the axis of rotation and a deflectable closure rotator arranged to engage the torque teeth included in the torque receiver to transmit torque from the torque-transmission member to the closure during installation of the base of the closure in the filler neck to cause the base to rotate in the filler neck in response to rotation of the outer handle in the cap-advancing direction relative to the filler neck, and handle-rotation travel-limit means for producing a predetermined number of separate discernable warning signals generated by engagement and subsequent disengagement of the deflectable closure rotator and torque teeth included in the torque receiver of the closure after the base of closure is rotated about the axis of rotation in the cap-advancing direction to reach a closure hard-stop position in the filler neck and cease further rotation in the cap-advancing direction and before the outer handle is rotated from an initial position about the axis of rotation in the cap-advancing direction relative to the closure in the closure hard-stop position to reach a handle hard-stop position and cease further rotation in the cap-advancing position relative to the closure so that continued rotation of the outer handle about the axis of rotation in the cap-advancing direction after the closure has reached the closure hard-stop position causes at most the predetermined number of separate discernable warning signals to be produced before the outer handle is rotated about the axis of rotation in the cap-advancing direction relative to the base of the closure to reach the handle hard-stop position, wherein the handle-rotation travel-limit means includes an anti-rotation stop coupled to the closure to rotate therewith and a rotation-inhibitor tab coupled to the outer handle to rotate therewith and to engage the anti-rotation stop to block further rotation of the outer handle in the cap-advancing direction relative to the closure that is stationary in the closure hard-stop position when the outer handle reaches the handle hard-stop position, and wherein the handle-rotation travel-limit means further includes handle-reset means for automatically rotating the closure about the axis of rotation relative to the outer handle in a cap-removal direction opposite to the cap-advancing direction while a user is gripping the outer handle as soon as the base of the closure is separated from the filler neck during a cap-removal activity to move the rotation-inhibitor tab to an initial position and establish a predetermined arcuate distance between the anti-rotation stop coupled to the closure and the rotation-inhibitor tab to cause a number of torque teeth included in the torque receiver that is equal to the predetermined number of separate discernable warning signals to lie in a signal-generation zone provided between the anti-rotation stop, the rotation-inhibitor tab, and the axis of rotation so that the deflectable closure rotator will engage and subsequently disengage said number of torque teeth during movement of the rotation-inhibitor tab relative to the base of the closure from the initial position to the handle hard-stop position.

2. The filler neck cap of claim 1, wherein the handle-reset means includes a torsion spring including an upper tang coupled to the outer handle, a lower tang coupled to the closure, and a coil arranged to wind around the axis of rotation to interconnect the upper and lower tangs.

3. The filler neck cap of claim 2, wherein the closure includes a torsion spring retainer coupled to the base to form a chamber therebetween and further comprising a pressure-relief system and a vacuum-relief system located in the chamber.

4. The filler neck cap of claim 3, wherein the torsion spring retainer includes a web coupled to the base to define the chamber therebetween and an upwardly extending post coupled to the web and arranged to extend upwardly away from the web along the axis of rotation through a central aperture formed in the torque-transmission member to mate with the lower tang of the torsion spring.

5. The filler neck cap of claim 2, wherein the outer handle includes a top wall arranged to overlie the torque-transmission member and a side wall arranged to extend downwardly from a peripheral portion of the top wall to surround an upper portion of the base and the anti-rotation stop, the rotation-inhibitor tab is coupled to the side wall of the outer handle to extend radially inwardly toward the axis of rotation, and the outer handle further includes a hollow hand grip coupled to the top wall at an opening formed in the top wall and arranged to extend upwardly away from the base, and the torsion spring is located in a hollow chamber formed in the hollow hand grip.

6. The filler neck cap of claim 5, wherein a torque tooth included in the torque receiver is positioned to lie between the rotation-inhibitor tab and the torque-transmission member once the outer handle is rotated to reach the handle hard-stop position.

7. The filler neck cap of claim 5, wherein the anti-rotation stop is positioned to lie between the torque receiver and the side wall of the outer handle.

8. The filler neck cap of claim 1, wherein the handle-rotation travel-limit means further includes a handle-locator stop coupled to the closure and arranged to lie in spaced-apart relation to the anti-rotation stop to define a tab-travel zone therebetween, the rotation-inhibitor tab is positioned to lie and move in the tab-travel zone relative to the closure during rotation of the outer handle about the axis of rotation from the initial position to the handle hard-stop position, and the handle-rotation travel-limit means further includes a handle-locator tab coupled to the outer handle to move therewith and positioned to lie in the tab-travel zone between the rotation-inhibitor tab and the handle-locator stop, and the handle-locator tab is arranged to engage the handle-locator stop coupled to the closure during automatic rotation of the closure about the axis of rotation relative to the outer handle in the cap-removal direction to establish the initial position of the rotation-inhibitor tab.

9. The filler neck cap of claim 8, wherein the handle-rotation travel-limit means further includes at least one stiffener tab coupled to the outer housing to rotate therewith and located between and in spaced-apart relation to each of the rotation-inhibitor and handle-locator tabs to provide means for rigidifying the outer handle.

10. The filler neck cap of claim 8, wherein the handle includes a top wall arranged to overlie the torque-transmission member and a side wall coupled to a peripheral portion of the top wall and arranged to surround an upper portion of the base of the closure and the rotation-inhibitor and handle-locator tabs are coupled to the side wall and arranged to extend radially inwardly toward the axis of rotation.

\* \* \* \* \*